United States Patent
Alper

(10) Patent No.: US 8,105,423 B2
(45) Date of Patent: Jan. 31, 2012

(54) PROCESS AND SYSTEM FOR SEPARATING FINELY AEROSOLIZED ELEMENTAL MERCURY FROM GASEOUS STREAMS

(76) Inventor: Hal Alper, Flowery Branch, GA (US)

(*) Notice: Subject to any disclaimer, the term of this patent is extended or adjusted under 35 U.S.C. 154(b) by 294 days.

(21) Appl. No.: 12/459,389

(22) Filed: Jun. 30, 2009

(65) Prior Publication Data

US 2010/0000409 A1    Jan. 7, 2010

Related U.S. Application Data

(63) Continuation-in-part of application No. 12/001,057, filed on Dec. 7, 2007, now Pat. No. 7,981,298.

(60) Provisional application No. 60/874,915, filed on Dec. 14, 2006.

(51) Int. Cl.
*B01D 50/00* (2006.01)
*B01D 53/64* (2006.01)

(52) U.S. Cl. ............... 95/285; 55/318; 55/431; 55/486; 55/520; 55/524; 55/527; 55/DIG. 25

(58) Field of Classification Search ............... 95/285; 55/315, 318, 430, 431, 434, 462, 482, 486, 55/520, 522, 524, 527, DIG. 25
See application file for complete search history.

(56) References Cited

U.S. PATENT DOCUMENTS

| | | | | |
|---|---|---|---|---|
| 1,808,170 A * | 6/1931 | Kamrath | ........................ | 55/315 |
| 2,107,945 A | 2/1938 | Hull et al. | | |
| 3,627,191 A * | 12/1971 | Hood, Jr. | ........................ | 228/19 |
| 3,786,619 A * | 1/1974 | Melkersson et al. | ............ | 95/134 |
| 4,050,237 A * | 9/1977 | Pall et al. | ...................... | 60/39.08 |
| 4,160,684 A * | 7/1979 | Berger et al. | ................... | 156/69 |
| 4,416,408 A | 11/1983 | Spirig | | |
| 4,705,543 A * | 11/1987 | Kertzman | ........................ | 96/6 |
| 4,925,463 A * | 5/1990 | Kuhnert | ........................ | 95/278 |
| 5,292,412 A | 3/1994 | Pitton | | |
| 5,409,522 A * | 4/1995 | Durham et al. | ................. | 75/670 |
| 5,437,793 A | 8/1995 | Alper | | |
| 5,698,139 A | 12/1997 | Alper | | |
| 5,837,146 A | 11/1998 | Alper | | |
| 5,961,823 A | 10/1999 | Alper | | |
| 6,180,010 B1 | 1/2001 | Alper | | |
| 6,805,727 B2 * | 10/2004 | Alper | ............................. | 95/90 |
| 6,811,588 B2 * | 11/2004 | Niakin | ........................ | 55/385.3 |
| 6,861,002 B2 | 3/2005 | Hughes | | |
| 6,958,136 B2 | 10/2005 | Chandran et al. | | |
| 7,264,722 B2 | 9/2007 | Alper | | |
| 7,476,365 B2 * | 1/2009 | Al-Faqeer | ..................... | 422/169 |
| 7,708,794 B2 * | 5/2010 | Dullien et al. | .................. | 55/484 |
| 2002/0027105 A1 | 3/2002 | Alper | | |
| 2009/0032472 A1 * | 2/2009 | Krogue et al. | ................ | 210/669 |

* cited by examiner

*Primary Examiner* — Frank Lawrence, Jr.
(74) *Attorney, Agent, or Firm* — Klauber & Jackson LLC

(57) ABSTRACT

A method and apparatus for practicing the method are provided for separating droplets of finely aerosolized elemental mercury from a gaseous stream in which the droplets are dispersed. In the method a gold plated metallic capillary surface is contacted with the gaseous stream, causing the aerosolized droplets to deposit on the capillary surface and by capillary action to coalesce with other of such droplets to form increasingly large drops of mercury. The surface is oriented to allow the mercury to flow by gravitational forces and capillary action to the lowermost portions of the surface, at which it accumulates, and is then collected at a suitable vessel.

31 Claims, 8 Drawing Sheets

Θ = contact angle, the angle formed by the solid/liquid interface and the liquid/vapor interface measured from the side of the liquid.

Θ = 0° Full wetting

PROCESS AND SYSTEM FOR SEPARATING FINELY AEROSOLIZED ELEMENTAL MERCURY FROM GASEOUS STREAMS

RELATED APPLICATION

This application is a continuation-in-part of U.S. non-provisional patent application Ser. No. 12/001,057, filed Dec. 7, 2007, now U.S. Pat. No. 7,981,298, which claims priority from U.S. provisional patent application Ser. No. 60/874,915, filed on Dec. 14, 2006. The disclosures of both applications are incorporated by reference herein in their entireties. Applicants claim the benefits of the non-provisional application under 35 U.S.C. §120, and claim the benefit of the provisional application under 35 USC §119(e).

FIELD OF INVENTION

This invention relates generally to methods and apparatus for removing pernicious contaminants from gaseous systems to preclude discharge of the contaminants into the surrounding environment, and more specifically relates to methods and devices for removing from a gaseous stream elemental mercury which is dispersed therein as a fine aerosol.

BACKGROUND OF INVENTION

In the course of practicing a wide variety of commercially important industrial processes, gaseous process streams (or more generally "gaseous systems") are produced which are contaminated with pernicious quantities of mercury. The mercury contaminants have proved to be particularly difficult to remove or reduce to acceptable levels. One of the most pernicious forms of mercury pollution is finely aerosolized elemental mercury. This form of mercury is generated by coal-fired power generation and is present in natural gas. In the U.S. coal-fired power plants are the largest source of man-made mercury emissions to the air, accounting for approximately 40% of all mercury emissions. Under current circumstances, mercury is adsorbed on the aerosolized soot from coal burning. This soot eventually settles and the mercury adsorbed on the carbon is converted to methyl mercury, dimethyl mercury, and other forms, which accumulate in the food chain. Alternatively, techniques have been developed which will cause the carbonaceous soot to auto-ignite and convert to $CO_2$ and $H_2O$. When this occurs, finely aerosolized elemental mercury is produced. The mechanism for conversion of elemental mercury to methyl mercury and other forms is not well understood but is most certainly microbially mediated. It is estimated that 2000 tons of mercury is generated this way annually. Elemental mercury also occurs in natural gas in concentrations up to hundreds of micrograms per $Nm^3$. This is a significant account considering that a typical plant will process millions of $Nm^3$ per day.

Currently there is no technology that is considered optimal for remediation of the mercury in its elemental aerosolized form. Although coalescers, brominated adsorbents, and other methods have been used, they either lack effectiveness or have significant negative aspects such as generation of large amounts of mercury-polluted material to be land-filled. Coalescers lack effectiveness due to the extremely small size and high surface tension of the droplets and also due to the lack of affinity for mercury of typical coalescer materials. Also known is a process based on photochemical oxidation. This has chiefly been known for use in treating flue gas wherein ultraviolet (UV) light is introduced into the flue gas, to convert elemental mercury to an oxidized form (i.e. mercuric oxide, mercurous sulfate, and mercurous chloride). Once in the oxidized form, mercury can be collected in existing air pollution control devices such as wet $SO_2$ scrubbers, electrostatic precipitators, and baghouses (fabric filters).

None of the foregoing techniques, however, have been fully successful in treating gaseous systems of the type with which the present invention is concerned. In addition to human and ecological effects, mercury in this elemental finely aerosolized form compromises the integrity of the steel and iron in the plants and pipeline for processing and transporting the gas, sometimes resulting in catastrophic failure and explosions or uncontrolled releases. It would be most desirable to capture and coalesce the droplets of mercury and to remove the mercury from these gaseous streams in its pure and elemental form, thus eliminating release and/or production of great quantities of mercury-polluted adsorbent.

SUMMARY OF INVENTION

The problem associated with capturing finely aerosolized elemental mercury is primarily one of overcoming the surface tension of the aerosolized droplet in order to allow the liquid mercury to wet out on a surface. Secondarily, the coalesced mercury must be prevented from re-aerosolizing off the substrate. One way to achieve this is by exploiting the contact angle of the droplet with a given interface.

Now in accordance with the present invention, a method (and apparatus for practicing the method) are provided for separating droplets of finely aerosolized elemental mercury from a gaseous stream in which the droplets are dispersed. In the method a metallic capillary surface is contacted with the gaseous stream, causing the aerosolized droplets to deposit on the capillary surface and by capillary action to coalesce with other of such droplets to form increasingly large drops of mercury. The surface is oriented to allow the mercury drops to flow by gravitational forces and capillary action to the lowermost portions of the surface or an extension of same where they accumulate, and are then collected at a suitable vessel or the like, e.g. by simply dropping into the vessel.

The present invention exploits the above phenomena by employing a capillary surface-bearing substrate, preferably comprised of finely braided strands of copper wire (e.g. approximately 40-gauge, 3 mil diameter, 192 wires/strand) which has an integral surface deposition of a precious metal such as gold. Gold has a demonstrated affinity for mercury. Generally when gold is deposited on copper, an intermediate metal such as nickel is first plated on the copper to act as a barrier to prevent inter-metallic formation of the copper and gold. In the present invention, however, this intermetallic formation is desirable as it results in a highly stable substantially unitary structure in the strands of the braid, which resist deterioration from the thermal cycling imposed by typical environments in which the invention is employed. In contrast, were a barrier layer of nickel present between the copper and gold, peeling or undercutting of the gold surface would over time become a serious problem.

The braided materials used in the invention are of a type that has been well known in the prior art as "solder wicks" because of their use to remove a solder connection. Such solder wicks are made of metal strands braided to form narrow interstices between the individual strands and to thereby provide a capillary surface at the wick's exterior. To form the wick the fine metal strands are typically braided together in the form of a tube, which is then flattened to make a braided ribbon. In a braided ribbon, the strands all extend in the longitudinal direction along the tube. The individual strands are in rather close engagement, yielding a ribbon with a limited volume between strands within which solder may be drawn. In one type of solder operation, the wick is placed on the solder connection and the connection is heated through the wick with a soldering iron. The solder melts and is drawn up onto the wick by capillary forces. Such solder wicks are generally made of copper wire.

Figure 5:
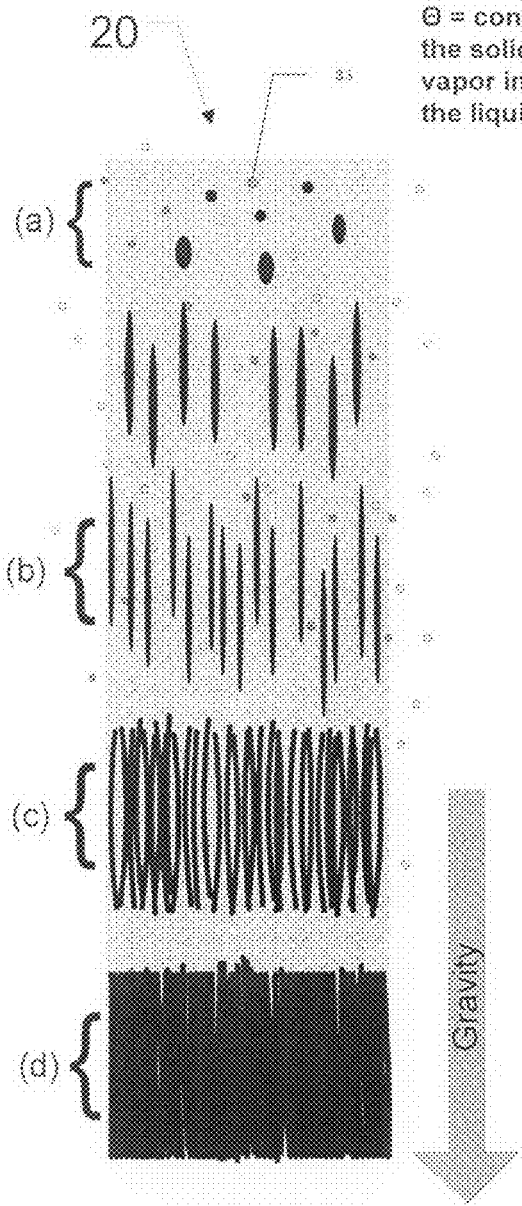
Figure 5A:
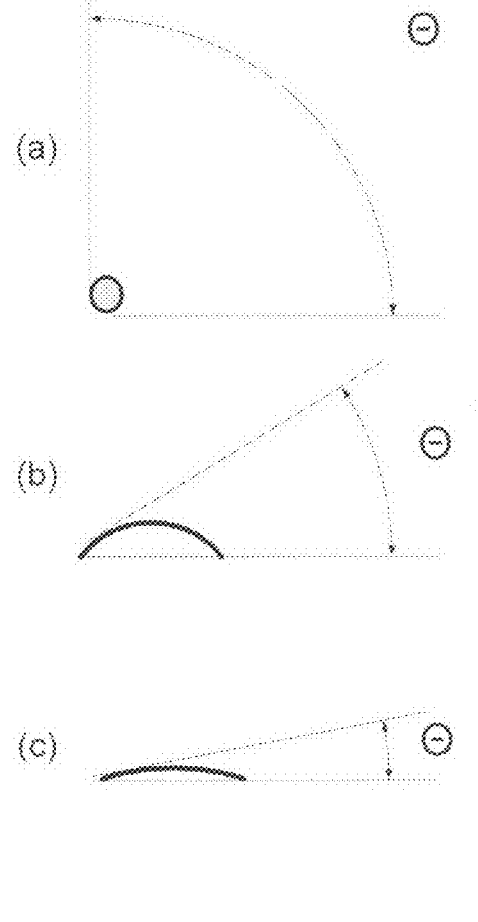
Figure 6:
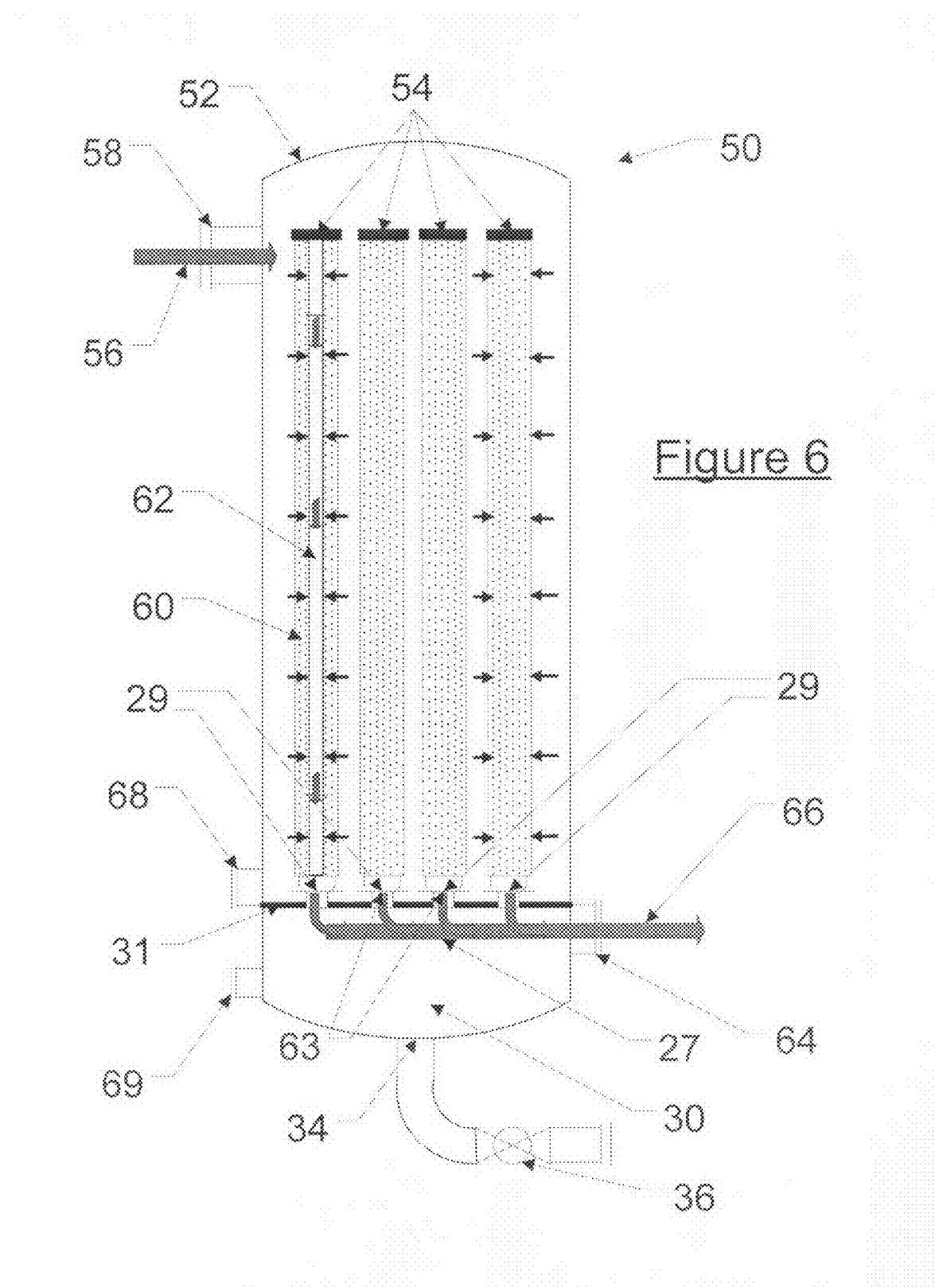
Figure 7:
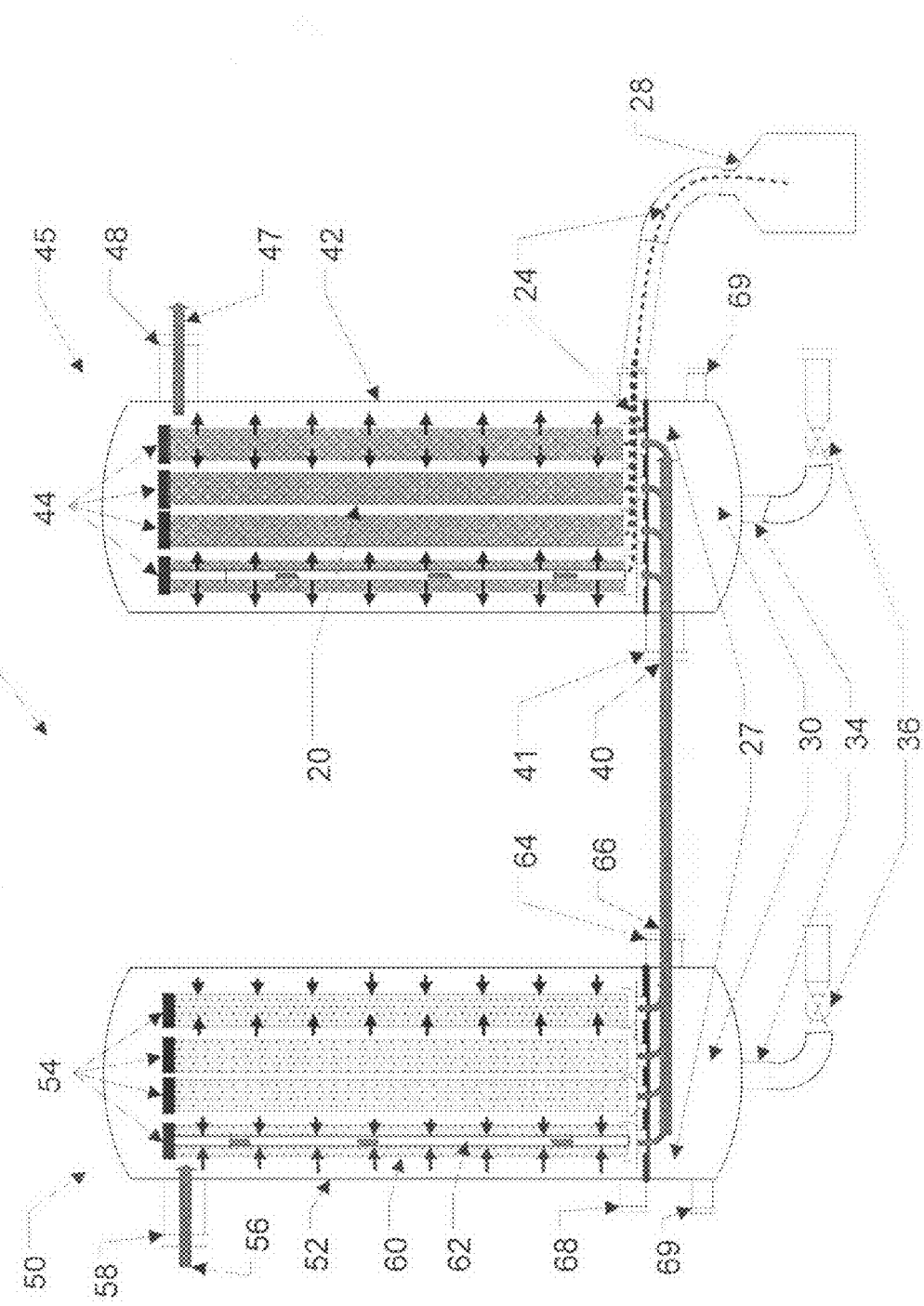
Figures 8, 9:
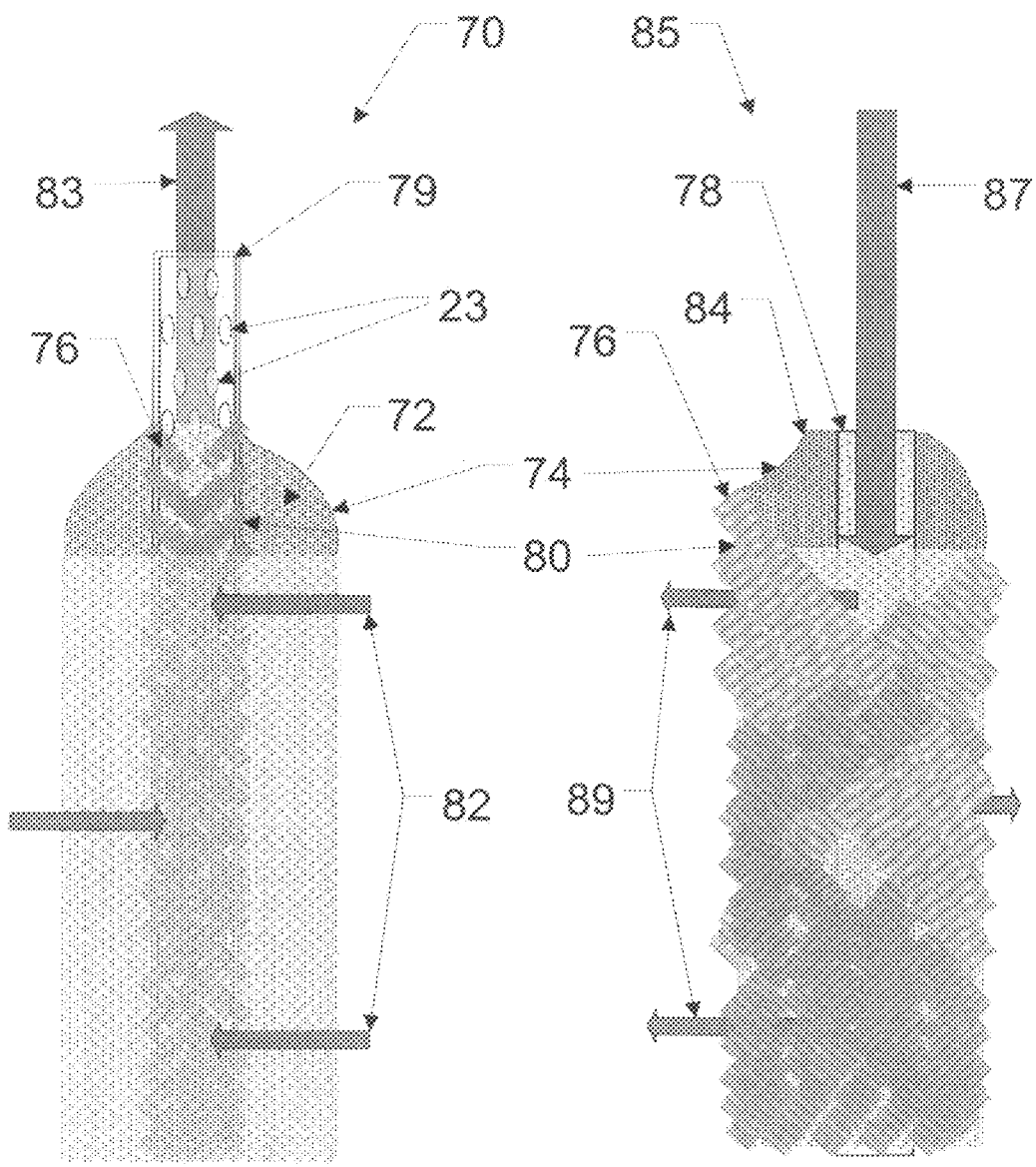

In U.S. Pat. No. 3,627,191 further details of such a solder wick are discussed, such as that the wick disclosed therein comprises a braid of strands of 40-gauge copper wire and the strands are in groups of four. The wick is braided from a machine having 16 heads so that the wick is 64 strands thick with 23 tucks 27 per inch. Other grades of wire and braiding patterns can also be used, e.g., 96 strands of 44 gauge can be braided in 16 groups of six strands, etc. Solder wicks have also been proposed for production by other than braiding. For example, U.S. Pat. No. 4,416,408 mentions the use of an open-mesh structure prepared by "weaving, stranding, braiding, knitting or crochetting", the preferred process therein involving the use of a knitting machine, which results in the aforementioned lower wire diameter limit of 0.1 mm. Regardless, the fundamental requirement is that the wick have a capillary surface capable of wicking the molten solder, and braided wicks have been found most suitable for this function. Although various open mesh structures such as discussed above are useable in the present invention if they possess an adequate capillary surface, the braided wicks are the preferred material for use in the present invention, In the present invention, the preferred braided wire is formed of copper and is preferably gold plated. The flattened ribbon-shaped wick can be wrapped around a filter or a metal core in the preferred form of a tube, with the wire strands all extending in the longitudinal direction along the tube, and the ribbon being in one or multiple layers so as to achieve the desired degree of filtration efficiency. The metal tube has porous walls, e.g. by being perforated, and the braid, despite the contact made by the mercury droplets with the capillary surface, is relatively pervious to flow of a gas stream through them so that the gas stream in which the mercury droplets are aerosolized can be flowed from the tube to the braid or from the braid to the tube, to enable contacting of the gold plated metallic capillary surface with the aerosolized mercury droplets. Such contact causes the droplets to deposit on the capillary surface and by capillary action to coalesce with other of said droplets to form increasingly large drops of mercury. When wound in this way around a core, high removal efficiency of aerosol mercury is achieved at very low differential pressures as the gas stream passes through the wound core. For a three-layer thickness of braid around a steel core, differential pressure is only between 1 to 3 psi at a gas flow rate of 600 million $ft^3$ per day. The braided structure of the substrate results in interstitial areas of extreme contact angle (less than 45 degrees), which is able to entrap the aerosol droplets. The combination of this contact angle (hereinafter defined), along with the affinity of gold for mercury results in the de-aerosolization of the droplets and wetting out on the substrate. When sufficient mercury has accumulated, so as to act like a bulk phase material, the surface tension of the liquid mercury will cause it to capillary flow along the axis of winding of the braid. This effect is exploited in combination with gravity to cause the captured liquid mercury to capillary down the filter and along a braided extension to a recovery point.

In an apparatus based on the foregoing method, a filtration system is provided for separating droplets of finely aerosolized elemental mercury from a gaseous stream in which the droplets are dispersed. The apparatus includes a metallic capillary surface and means for contacting metallic capillary surface with the gaseous stream, causing the droplets to deposit on the surface and by capillary action to coalesce with other of the droplets to form increasingly large drops of mercury. The said capillary surface is oriented to allow the mercury drops to flow by gravitational forces and capillary action to the lowermost portion of the surface where it accumulates; and means are provided for collecting the accumulating mercury thereby separated from the gas stream. The capillary surface is preferably defined at the surface of a wick made of braided copper strands; and the strands are preferably gold plated.

In a further aspect of the apparatus of the invention, a filtration system is provided for separating droplets of finely aerosolized elemental mercury from a gaseous stream in which the droplets are dispersed. The system includes a generally enclosed tank having an inlet for receiving the gaseous stream and an outlet for discharging the gaseous stream after the mercury has been removed. One or more filters are positioned in the tank, which filters include a perforated wall tube wound with a substrate formed from a wick made of metal strands braided to form narrow interstices between the individual strands which thereby provide a capillary surface at the wick's exterior. Means are provided for flowing the gas stream entered into the tank through the perforated wall of the tube and the wound substrate to effect contact of the metallic capillary surface of the substrate with the gaseous stream, causing the droplets to deposit on the capillary surface and by capillary action to coalesce with other of said droplets to form increasingly large drops of mercury. Means are provided for passing the gas stream having contacted the capillary surface to the gas discharge outlet. The tube and capillary surface are oriented to allow the mercury drops to flow by gravitational forces and capillary action to the gravitationally lowermost portion of said surface where the mercury accumulates; and means are provided in the system for receiving and collecting the accumulating mercury thereby separated from the gas stream.

Since depending on its source, the gas stream treated by the invention may include undesirable hydrocarbons and oily organic compounds organic compounds dispersed as minute aerosolized particles or mists in the gaseous media, systems and methods based on the invention may further include means to prefilter the gaseous stream before it is contacted with the capillary surface, to remove the dispersed hydrocarbons and oily organic compounds.

BRIEF DESCRIPTION OF DRAWINGS

The invention is diagrammatically illustrated by way of example in the drawings appended hereto in which:

FIG. 1 is a schematic longitudinal cross-section showing a filtering system utilizing a metal capillary ("MC") filter in accordance with the invention to remove and collect finely aerosolized mercury, the depiction showing the MC filter in an outside-in gas stream flow arrangement;

FIG. 2 is a schematic longitudinal cross-section similar to FIG. 1, except that the depiction shows the MC filter in an inside-out flow arrangement;

FIG. 3 is an enlarged schematic cross-section of the mercury removal reservoir of FIGS. 1 and 2, showing the lower portions of the capillary braid delivering the collected mercury to the reservoir;

FIG. 4 is a schematic elevational view of a portion of the MC filter showing the core of the filter and portions of the braid which is wound on the core;

FIG. 4A is an enlarged view of a portion of the braid in FIG. 4;

FIG. 5 is a schematic showing of the capillary surface of the braid in the MC filters of the prior Figures and together with adjacent FIG. 5A shows the progressive change in the contact angles at the mercury-capillary surface interface as the coalescing drops proceed downwardly on the braid;

FIG. 6 is a schematic longitudinal cross-section showing an oleophilic prefilter which may be used in a gas filtering system upstream of the metal capillary ("MC") filter in order to remove organic and other contaminants that may be present in the gas flow, prior to the flow being acted upon by the MC filter or filters, the depiction showing the oleophilic prefilter in an outside-in flow arrangement;

FIG. 7 is a schematic longitudinal cross-section showing a two stage mercury removal filtering system in which the first stage is an oleophilic prefilter as in FIG. 6, and the second stage is a metal capillary ("MC") filter for removing and collecting finely aerosolized mercury, the depiction showing the MC filter in an inside-out flow arrangement;

FIG. 8 is a schematic elevational view, partly sectioned, which shows a composite filter incorporating the two stages used in the FIG. 7 embodiment, the oleophilic prefilter being coaxial with but outside of the MC filter, and with the gas stream flow proceeding radially inward toward the composite filter axis; and FIG. 9 is a schematic elevational view, partly sectioned, which shows a composite filter incorporating the two stages used in the FIG. 7 embodiment, but differing from the FIG. 8 embodiment in that the oleophilic prefilter is coaxial with but inside of the MC filter, and with the gas flow proceeding outwardly from the axis of the composite filter.

DESCRIPTION OF PREFERRED EMBODIMENT

Figure 1:
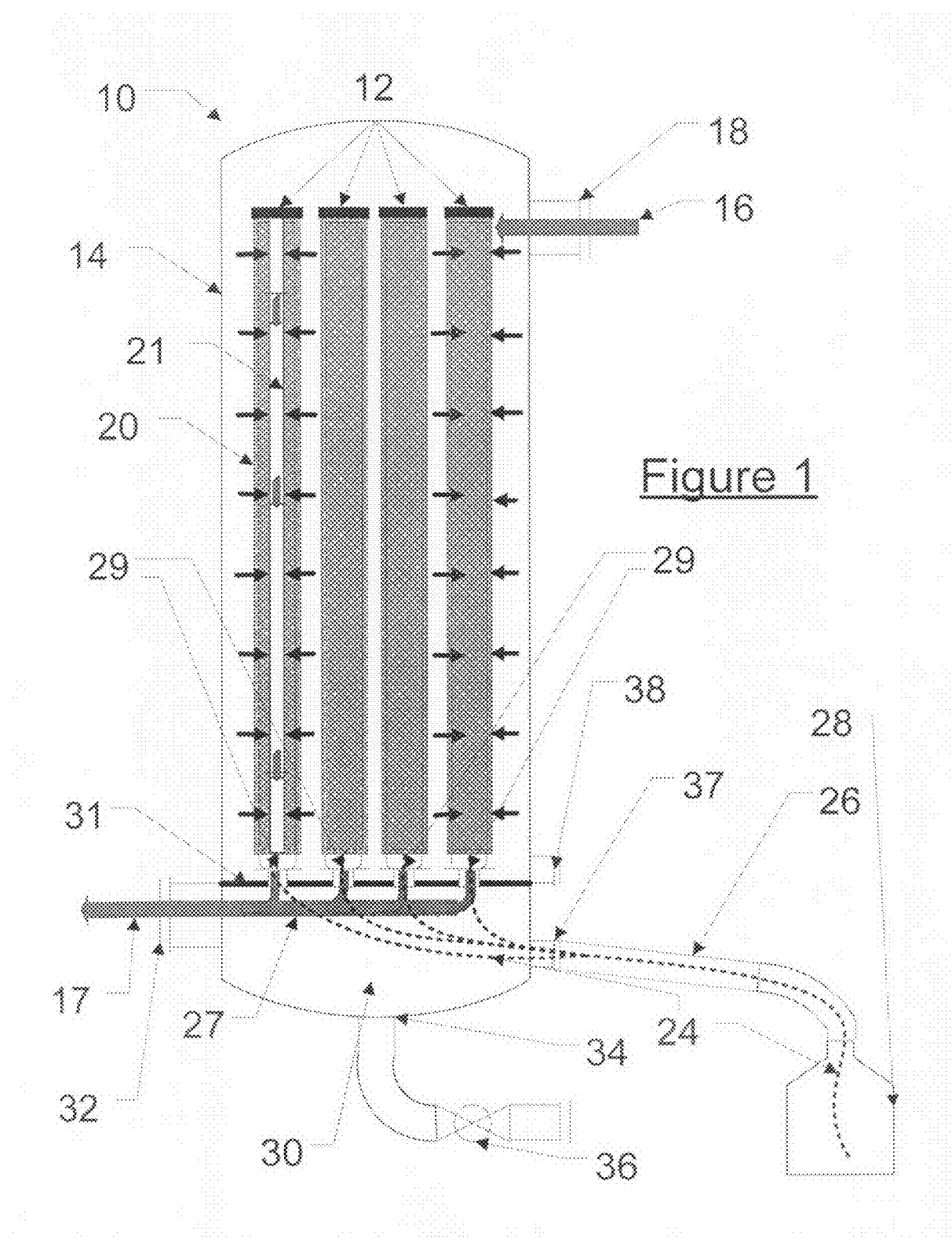
Figures 4, 4A:
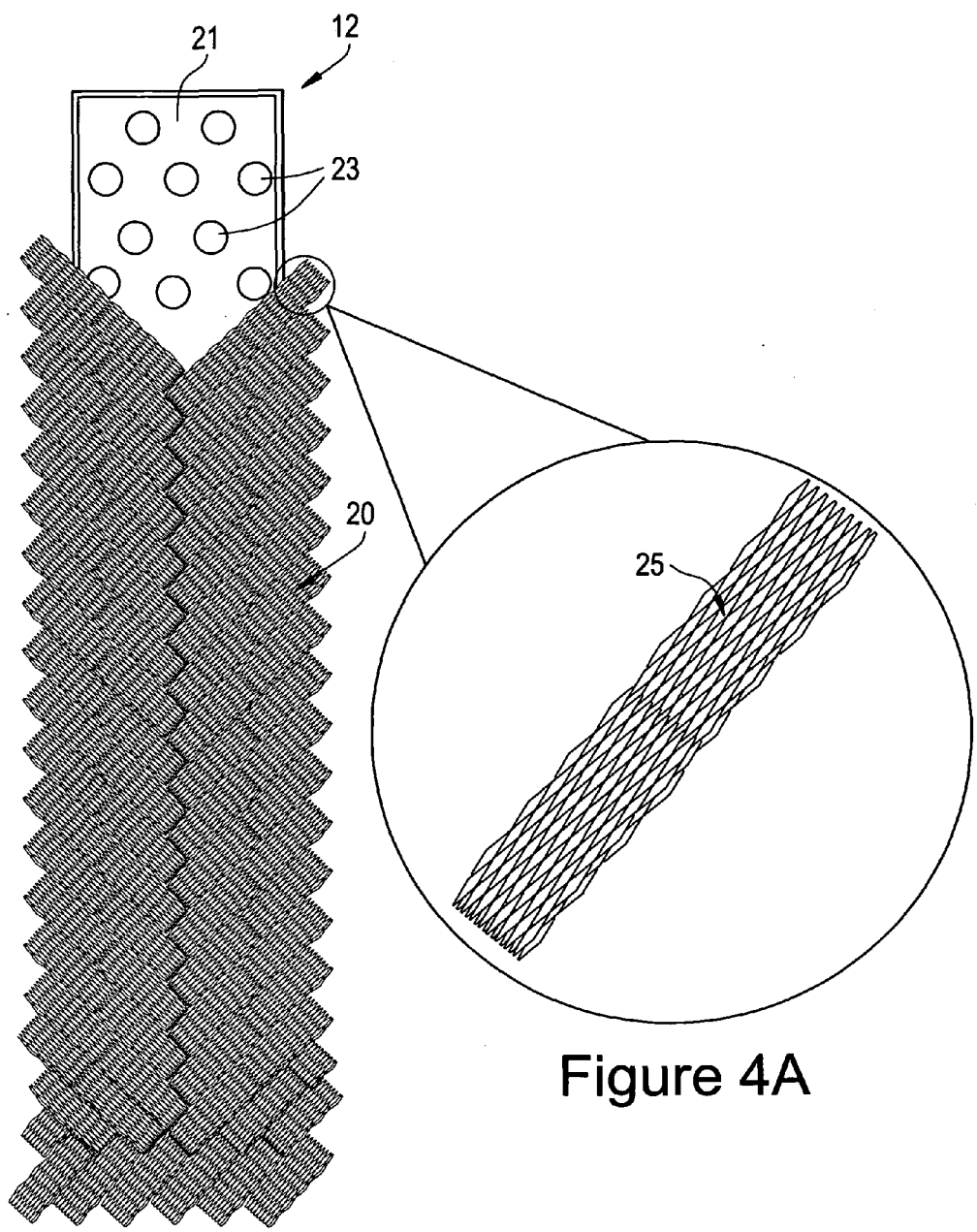

Referring to the schematic block diagram of FIG. 1, a filtering system 10 is shown which utilizes metal capillary ("MC") filters 12 in accordance with the invention to remove and collect finely aerosolized mercury. In system 10 four identical MC filters 12 are mounted in a tank 14 to function in parallel in treating a gas flow stream 16 provided to tank 14 via inlet 18. The actual number of MC filters 12 can be greater or smaller than the exemplary four shown. The gas flow in tank 14 enters into each of the MC filters by passing through the capillary surface presented by the metallic braid 20 which in the MC filter is wound upon a stainless steel core or tube 21, the walls of which, as seen in FIG. 4, are perforated by openings 23. The braided materials used, as discussed above, are of the type that has been well known in the prior art as "solder wicks" because of their previous use to remove solder connections. Such solder wicks are made of metal strands braided to form narrow interstices between the individual strands and to thereby provide a capillary surface at the wick's exterior. To form the wick the metal strands are typically braided together in the form of a tube, which is then flattened to make a braided ribbon 25 as seen in FIG. 4A. The wick discussed In U.S. Pat. No. 3,627,191 comprises a braid of strands of copper wire, which unlike the present braid is overcoated with flux. In this prior patent, the wire is 40-gauge and the strands are in groups of four. The wick is braided from a machine having 16 heads so that the wick is 64 strands thick with 23 tucks 27 per inch. Such a wick (minus the flux) is suitable for use in the present invention, preferably when modified by a gold plating, but other grades of wire, and braiding patterns can also be used, e.g., 96 strands of 44 gauge can be braided in 16 groups of six strands, etc. The fundamental requirement is that the wick have a capillary surface capable of wicking the mercury that pursuant to the present invention is deposited on the capillary surface.

In the present invention, the preferred braided wire 20 is of copper and gold plated and the flattened ribbon-shaped wick is wrapped around a filter or the porous wall metal tube 21 in one or multiple layers so as to achieve the desired degree of filtration efficiency. When wound in this way, high removal efficiency of aerosol mercury is achieved at very low differential pressures. For a three layer thickness of braid around a steel tube with wall perforations as in FIG. 4, differential pressure is only between 1 to 3 PSI at a gas stream flow rate of 600 million $ft^3$ per day.

Figure 3:
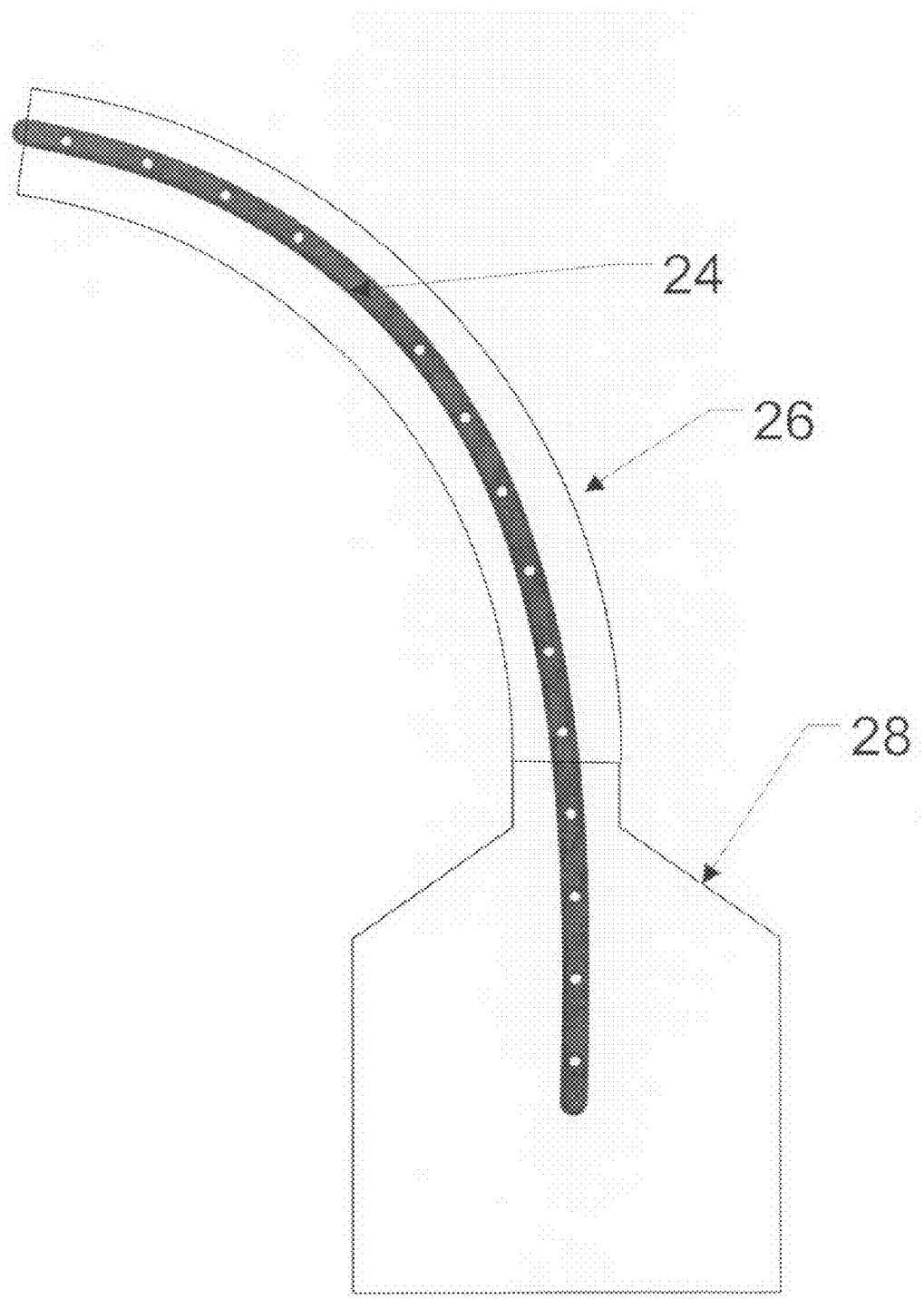

FIG. 5 shows how the aerosolized mercury droplets 33 in the gas stream deposit on the capillary surface of braid 20 and then gradually coalesce and increasingly wet the said surface as they advance downwardly in the sense of the Figure, driven by capillary action and aided by gravity. FIG. 5A to the right of FIG. 5 graphically depicts the approximate change in contact angle as the collected mercury droplets coalesce and advance downwardly in FIG. 5, where the well-known parameter "contact angle" is defined here as the angle formed by the solid/liquid interface measured from the side of the liquid. Four approximate regions (a), (b), (c), and (d) are shown in FIG. 5 in the descending direction on braid 20. In FIG. 5A approximate contact angles are depicted for these four regions, The braided structure of the substrate thus results in interstitial areas of an extreme contact angle (greater than 45 degrees—as seen at region (a) at the top of FIG. 5) which is able to entrap the aerosol droplets 33. The combination of this contact angle, along with the affinity of gold for mercury results in the de-aerosolization of the droplets and increasing wetting out of the substrate surface as shown by the sequence of contact angles in regions (b), (c), and (d), proceeding downwardly in FIGS. 5 and 5A. When sufficient mercury has accumulated, so as to act like a bulk phase material, the surface tension of the liquid mercury and the gravitational influence of the vertical orientation of the MC filters will cause the mercury to capillary flow along the axis of winding of the braid. This effect is exploited to cause the captured liquid mercury to capillary down the filter and along the braided extensions 24 (FIG. 1) to a recovery point, i.e. in this instance to the mercury removal reservoir 28. The enlarged view of FIG. 3 shows the several braid extensions 24 which at this point can be intertwined together, exit the tank through port 37 (FIG. 1), pass through duct 26 and enter the mercury removal reservoir 28, where the mercury is collected as it wicks down the braids and drops from the bottom ends thereof.

The gas stream 17 from which the aerosolized mercury has been removed exits the core interiors 21 of MC filters at outlets 29 into plenum 27, which is separated from the rest of tank 14 by a plate 31, which extends across the tank, and then exits tank 14 via outlet 32. Since some condensation will tend to occur in the plenum 27, the bottom of the plenum defines a sump 30 for which a drain outlet 34 and valve 36 are provided. In addition further connection ports to the tank 14, such as at 38, enable gauges or other instrumentation to be connected as desired to the tank 14 or to one or more of the MC filters 12 or portions thereof.

Figure 2:
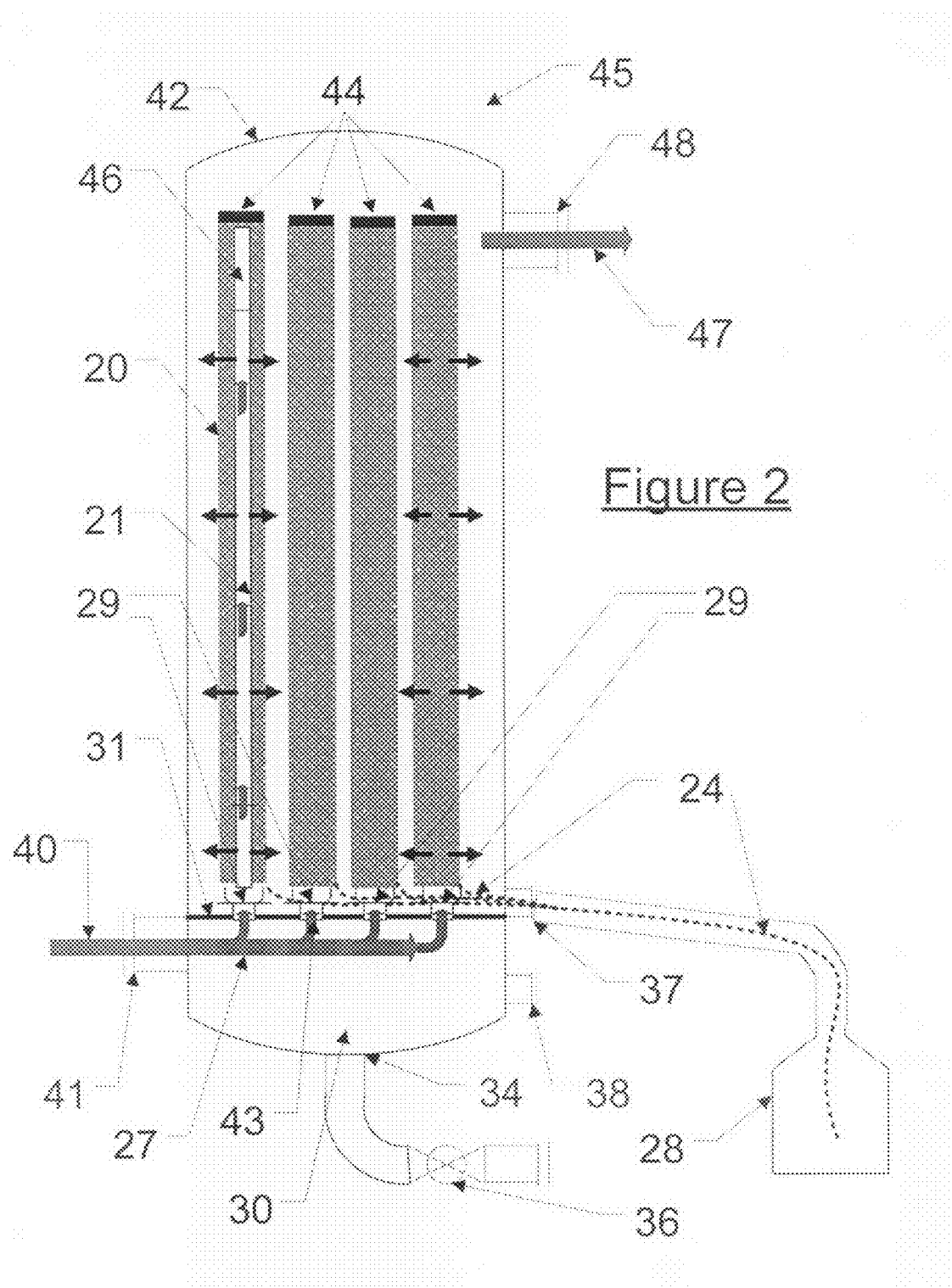

In FIG. 1 the depiction shows the MC filter in an outside-in flow arrangement. FIG. 2 shows the MC filters being used in inside-out flow arrangements. Thus in the filtration system 45 of FIG. 2 (where identical elements are identified by corresponding reference numerals) the stream 40 enters the plenum 27 via inlet 41 at the bottom of tank 42, and passes into MC filters 44 via the hollow axial interiors 46 of cores 21. Then after passing through the openings of the perforated walls of cores 21 the stream 40 passes to the metallic braid 20 wound upon the core 46 of each MC filter 44, where the same action occurs as discussed in connection with FIG. 1, with the depositing mercury droplets again coalescing and advancing by capillary action aided by gravity, to reach the mercury removal reservoir 28. The gas stream 47 with the mercury removed exits tank 42 via outlet 48.

While a principal concern of the present invention is the removal of finely aerosolized mercury, the gaseous streams treated by the invention in many instances may additionally include undesirable organic compounds such as hydrocarbons and various oily compounds dispersed as minute aerosolized particles or mists in the gaseous media. As taught, however, in the invention of my U.S. Pat. No. 6,805,727 the disclosure of which is hereby incorporated by reference, the compositions disclosed in my U.S. Pat. Nos. 5,437,793; 5,698,139; 5,837,146; and 5,961,823 (all of which disclosures are hereby incorporated by reference), have extremely strong affinities for the aforementioned mist contaminants and other dispersed and/or aerosol particles in air and gas streams; and that when such streams containing these contaminant particles are passed through fluid-pervious filtration media incorporating these inventive compositions, the mentioned contaminants are immobilized at the media, as a result of which concentration levels of the contaminants in the stream filtrate may be reduced to very low values, in some instances below detectable limits in a single pass.

The fluid-pervious filtration media in my U.S. Pat. No. 6,805,727 is treated with an absorption composition cured in situ at the media, the composition comprising a homogeneous thermal reaction product of an oil component selected from the group consisting of glycerides, fatty acids, alkenes, and alkynes, and a methacrylate or acrylate polymer component. Filter configurations incorporating the said may be based on various air or gas stream permeable substrates, such as shredded, spun or otherwise configured polypropylene, polyethylene or shredded or spun cellulose, or polyester cellulose which substrates are infused or otherwise treated with the absorbent compositions, which are then cured to produce the surface modified filter. Similarly the said absorbent compositions can be incorporated into or upon other filtering substrates and media, such as paper, including compressed pulp materials, particulate porous foamed plastics, fiberglass, mineral particulates such as perlite and vermiculite, and particulate, fibrous or porous ceramic media. The resulting substrate filter may be used independently to treat an air or other gas stream from which contaminating mists or other dispersed or suspended particles are to be removed, or can be used (especially for removal of mists) in conjunction with a conventional filter, as for example by being placed in front of (i.e., in series with) the conventional filter through which the air or gas stream passes.

The filters of my U.S. Pat. No. 6,805,727 accordingly can find use as a prefiltration stage, which cooperates with a downstream mercury removal filtration stage. FIG. 6 is a schematic longitudinal cross-section showing a prefiltration stage, which shall herein be referred to as an "oleophilic prefilter", which makes use of the foregoing filtration media. The oleophilic prefilter system 50, which thus may be used in a gas filtering system upstream of the metal capillary ("MC") filter in order to remove aerosolized and particulate organic and other contaminants that may be present in the gas flow prior to the flow being acted upon by the MC filter or filters, is shown in an outside-in flow arrangement. The oleophilic prefilter system 50 has an overall similarity in arrangement of its components to the devices of FIGS. 1 through 5. Thus a prefiltration tank 52 is provided in which are mounted in parallel feed fashion four oleophilic filters 54 which are arranged for outside-inside stream flow. Stream 56 enters the tank 52 through inlet 58, and then passes into each hollow core filter 54 via the oleophilic filtration media 60, which is positioned about the cores 62. This media 60 is in accord with that described in my aforementioned U.S. Pat. No. 6,805,727, and thus serves to remove the said aerosolized organics from the gas stream. The gas stream from the several in-parallel filters then exits the axial passages of cores 62 via the bottom core outlets 63 and enters the plenum 27 from which the stream 66 is discharged at outlet 64. Corresponding reference numerals, such as drain 34 and valve 36, identify additional elements in the Figure, which are functionally the same as in prior Figures. Two extra ports 68 and 69 are shown, the first connecting to the tank 52 interior above plate 31, and the second to plenum 27 below plate 31. These ports can be used with instrumentation or the like for measuring desired parameters in the spaces with which the ports communicate.

FIG. 7 is a schematic longitudinal cross-section showing a two stage mercury removal filtering system 55 in which the first stage is an oleophilic prefilter system 50 as in FIG. 6, and the second stage is an MC filter system 45 as in FIG. 2 for removing and collecting finely aerosolized mercury. Corresponding elements of the filter systems 50 and 45 are identified here by corresponding reference numerals of FIGS. 6 and 2. The output flow 66 from outlet 64 of prefilter system 50 is schematically shown entering MC filter system 45 as stream 40. The physical duct between outlet 64 and inlet 41 is not shown, but can take any convenient form such as a pipe or the like. The oleophilic filter is thus disposed upstream of the MC filter so that the former acts as a prefilter for the latter.

As has been discussed in the "Background of Invention" section herein, the present invention is inter alia applicable to remediation of various flue and exhaust gases, such as those produced in coal-fired power generation. In such instances (as well as in other environments in which exhaust gases result from combustion of high energy carbon-based fuels), mercury droplets may not be the only pernicious aerosolized droplets. Of additional concern are finely aerosolized organic compounds such as hydrocarbons in the C6 to C13 range, which encompass various diesel and gasoline components. In a further aspect of the present invention, it has been found that these aerosolized organic droplets can be coalesced with great efficacy by the use of the invention. Thus it has been found that use of a system such as that illustrated in FIG. 7 and described in the preceding paragraph, can effect coalescence of the mentioned organic droplets conjunctively with coalescence of the mercury droplets. The coalescing organics can thus be collected primarily in prefilter system 50 at the sump 30 of prefiltration tank 52, while the mercury is coalesced primarily in the mercury filtration tank 42 of the MC filter system 45, where it is then collected at an external mercury collection vessel 28. It will be further appreciated that the prefilter system 50 may also act to remove small portions of the dispersed mercury along with the various condensates that collect at sump 30. These mercury components can, if sufficient in quantities to warrant such action, be separated from the discharge at drain 34 of tank 52 by conventional chemical or physical methods. Alternatively, portions of the condensate can be converted to a vaporous form and recycled through MC filter 45 to recover such additional mercury.

FIG. 8 is a schematic elevational view, partly sectioned which shows a composite filter 70 incorporating the two stages used in the FIG. 7 embodiment, the oleophilic prefilter 72 being coaxial with but outside of the MC filter 76, and with the gas stream flow 82 proceeding radially inward toward the composite filter 70 axis. The oleophilic filtration media 74 may be wound or packed about MC filter 76 and held in place by retaining means such as string, and comprises the same materials as discussed for media 60 in FIG. 6. The MC filter 76 is formed of a perforate walled hollow core 79 of stainless steel or the like, about which the metallic braid 80 is wound. The gas stream 82 flows in the directions shown by the arrows so that the oleophilic filter stage performs its desired prefiltration function. The gas stream, then devoid of the mercury, exits as shown at 83, where it is collected, for example by the entire system 70 being mounted in a surrounding tank or the like as in prior discussed embodiments, In FIG. 9 a schematic elevational view, partly sectioned, shows a composite filter system 85 incorporating the two stages used in the FIG. 8 embodiment, but differing from the FIG. 8 embodiment in that the oleophilic prefilter 84 is coaxial with but inside of the MC filter 76, and with the gas flow 87 being introduced to and then proceeding outwardly from the hollow axial portion of the perforated wall core 78. Braid 80 is therefore wound at the outside of the composite filter so that the gas stream being treated passes radially through the oleophilic prefilter 84 prior to reaching the MC filter 76, at which the mercury droplets are collected as previously described. The gas stream, then devoid of the mercury, exits as shown at 86, where it is collected, for example by the system 85 being mounted in a surrounding tank or the like, In both the embodiments of FIGS. 8 and 9 the mercury accumulating at the bottom portions of the wound braid 80 can then be collected, e.g. by the braid extending to a suitable collection point or vessel.

While the present invention has been set forth in terms of specific embodiments thereof, the instant disclosure is such that numerous variations upon the invention are now enabled to those skilled in the art, which variations yet reside within the scope of the present teaching. Accordingly, the invention is to be broadly construed and limited only by the scope and spirit of the claims now appended hereto.

The invention claimed is:

1. A method for separating droplets of finely aerosolized elemental mercury from a gaseous stream in which the droplets are dispersed; comprising:
contacting a metallic capillary surface with said gaseous stream, causing said droplets to deposit on said surface and by capillary action to coalesce with other of said droplets to form increasingly large drops of mercury;
and wherein the said surface is oriented to allow the mercury drops to flow by gravitational forces and capillary action to the lowermost portion of said surface where it accumulates; and
collecting the accumulating mercury thereby separated from the said gas stream.

2. A method in accordance with claim 1, wherein the metallic capillary surface is gold plated.

3. A method in accordance with claim 2, wherein the mercury accumulating at the lowermost portion of said surface is collected by allowing it to fall into a collecting vessel.

4. A method in accordance with claim 2, wherein the capillary surface is defined at the surface of a wick made of metal strands braided to form narrow interstices between the individual strands which thereby provide said capillary surface at the wick's exterior.

5. A method in accordance with claim 2, wherein said metal strands comprise copper.

6. A method in accordance with claim 5, wherein said braided strands are flattened into a ribbon which is wound on a core with the said strands all extending in the longitudinal direction along the core, the capillary surface being defined at the surface of said wound ribbon.

7. A method in accordance with claim 2, wherein the said gaseous stream is prefiltered before being contacted with said capillary surface, to remove undesirable hydrocarbons and oily organic compounds dispersed as minute aerosolized particles or mists in the gaseous media.

8. A method in accordance with claim 7 wherein the prefiltration is effected by passing the gaseous stream through a gas pervious filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the media.

9. A method in accordance with claim 3, wherein the gas stream is generated by coal-fired power generation.

10. A filtration system for separating droplets of finely aerosolized elemental mercury from a gaseous stream in which the droplets are dispersed; comprising:
a metallic capillary surface
means for contacting said metallic capillary surface with said gaseous stream, causing said mercury droplets to deposit on said surface and by capillary action to coalesce with other of said droplets to form increasingly large drops of mercury;
and wherein the said capillary surface is oriented to allow the mercury drops to flow by gravitational forces and capillary action to the lowermost portion of said surface where it accumulates; and
means for collecting the accumulating mercury thereby separated from the said gas stream.

11. A filtration system in accordance with claim 10, wherein the metallic capillary surface is gold plated.

12. A filtration system in accordance with claim 11, further including a vessel for receiving the said accumulating mercury.

13. A filtration system in accordance with claim 12, wherein the capillary surface is defined at the surface of a wick made of gold plated metal strands braided to form narrow interstices between the individual strands which thereby provide said capillary surface at the wick's exterior.

14. A filtration system in accordance with claim 13, wherein said metal strands comprise copper.

15. A filtration system in accordance with claim 14, wherein said braided strands are flattened into a ribbon which is wound on a tube with the said strands all extending in the longitudinal direction along the tube, the capillary surface being defined at the surface of said wound ribbon.

16. A filtration system in accordance with claim 14, further including means to prefilter the said gaseous stream before it is contacted with said capillary surface, to remove undesirable hydrocarbons and oily organic compounds organic compounds dispersed as minute aerosolized particles or mists in the gaseous media.

17. A filtration system in accordance with claim 16, wherein the means for prefiltration comprises means for passing the gaseous stream through a gas pervious filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the media.

18. A filtration system in accordance with claim 15, wherein the prefiltration means is positioned coaxially and surrounding the said tube and the braid ribbon wound upon the tube, and the said tube have perforated walls; whereby the gaseous flow to be treated may be passed radially inward through said media and to the ribbon, thence into the tube interior from which it may flow having been cleaned of the aerosolized mercury, and the hydrocarbon and oily organic particles.

19. A filtration system in accordance with claim 14, including a tube having perforated walls; and further including means to prefilter the said gaseous stream before it is contacted with said capillary surface to remove undesirable hydrocarbons and oily organic compounds organic compounds dispersed as minute aerosolized particles or mists in the gaseous media;
wherein the means for prefiltration comprises means for passing the gaseous stream through a gas pervious oleophilic filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the said oleophilic media;
wherein said braided strands are flattened into a ribbon, the capillary surface being defined at the surface of said ribbon which is wound on said tube with the said strands all extending in the longitudinal direction along the tube; and wherein the prefiltration means is positioned coaxially and surrounding the said tube; and wherein the braid ribbon is wound about the outside of the filtration media coaxially with the tube; whereby the gaseous flow to be treated may be passed to the interior of the tube, then radially outward through said oleophilic filtration media and to the ribbon, from which it may flow radially outward having been cleaned of the aerosolized mercury and the removed hydrocarbon and oily organic particles.

20. A filtration system for separating droplets of finely aerosolized elemental mercury from a gaseous stream in which the droplets are dispersed; comprising:
a generally enclosed mercury filtration tank having an inlet for receiving said gaseous stream and an outlet for discharging the gaseous stream after the said mercury has been removed;
a filter being positioned in said mercury filtration tank comprising a perforated wall tube wound with a metallic substrate having a gold plated capillary surface;
means for flowing the gas stream entered into said tank through the said perforated wall of said tube and the wound substrate to effect contact of said gold plated metallic capillary surface of said substrate with said gaseous stream, causing said droplets to deposit on said surface and by capillary action to coalesce with other of said droplets to form increasingly large drops of mercury;
means for passing the gas stream having contacted said capillary surface to the said gas discharge outlet;
the said tube and capillary surface being oriented to allow the mercury drops to flow by gravitational forces and capillary action to the gravitationally lowermost portion of said surface where it accumulates; and
means for collecting the accumulating mercury thereby separated from the said gas stream.

21. A filtration system in accordance with claim 20, including a plurality of said filters in said mercury filtration tank.

22. A filtration system in accordance with claim 21, wherein the capillary surface is defined at the surface of a wick made of gold plated metal strands braided to form narrow interstices between the individual strands which thereby provide said capillary surface at the wick's exterior, said wick comprising the said wound substrate.

23. A filtration system in accordance with claim 22, wherein said braided strands are flattened into a ribbon which is wound on said tube, with the said strands all extending in the longitudinal direction along the tube, the capillary surface being defined at the surface of said wound ribbon.

24. A filtration system in accordance with claim 23, further including a collecting vessel external to said tank for receiving the said accumulating mercury; and wherein said wick of said one or more filters in said mercury filtration tank are extended through an outlet of said tank to said vessel.

25. A filtration system in accordance with claim 23, wherein said metal strands comprise copper.

26. A filtration system in accordance with claim 25, wherein the said gas stream includes undesirable hydrocarbons and oily organic compounds organic compounds dispersed as minute aerosolized particles or mists in the gaseous media; and further including means to prefilter the said gaseous stream before it is contacted with said capillary surface, to remove undesirable hydrocarbons and oily organic compounds organic compounds dispersed as minute aerosolized particles or mists in the gaseous media.

27. A filtration system in accordance with claim 26, wherein said prefilter means are upstream of the said mercury filtration tank.

28. A filtration system in accordance with claim 27, wherein the means for prefiltration comprises means for passing the gaseous stream through a gas pervious filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the media.

29. A filtration system in accordance with claim 27, wherein the said mercury filtration tank is divided by a cross plate into an upper chamber above the plate and a lower chamber below said plate; the gaseous stream inlet being in communication with one of said chambers, and the gaseous stream discharge outlet being in communication with the other; the said filters being in one of the two said chambers with the interior of said tube communicating with the other chamber; whereby the flow through said filter is either radially from the outside of the tube inwardly, or radially from the inside of the tube outward, depending on whether the interior of the tube or the exterior of the tube is the recipient via the chamber in which it is resident of the upstream flow of the gaseous stream.

30. A filtration system in accordance with claim 27, wherein the said prefiltering means comprises
a generally enclosed prefiltration tank having an inlet for receiving said gaseous stream and an outlet for discharging the gaseous stream after the said hydrocarbons and oily organic compounds organic compounds dispersed as minute aerosolized particles or mists in the gaseous media have been removed;
an oleophilic filter being positioned in said prefiltration tank;
means for flowing the gas stream entered into said prefiltration tank through the said oleophilic filter;
means for passing the gas stream having contacted said oleophilic filter to the said gas discharge outlet; and
means connecting the outlet flow from said prefiltration tank to the inlet of the mercury filtration tank.

31. A system in accordance with claim 30, wherein the means for prefiltration comprises means for passing the gaseous stream through a gas pervious oleophilic filtration media which has been infused with an absorption composition comprising a homogeneous thermal reaction product of an oil component selected from the group consisting of glycerides, fatty acids, alkenes and alkynes, and a methacrylate or acrylate polymer component, whereby the removed hydrocarbon and oily organic particles are immobilized at the said oleophilic media.

* * * * *